US007016936B2

(12) United States Patent
Wilkinson et al.

(10) Patent No.: US 7,016,936 B2
(45) Date of Patent: Mar. 21, 2006

(54) REAL TIME ELECTRONIC SERVICE INTERACTION MANAGEMENT SYSTEM AND METHOD

(75) Inventors: William K. Wilkinson, Sunnyvale, CA (US); Vineet Singh, Cupertino, CA (US); Dirk M. Beyer, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 09/858,704

(22) Filed: May 15, 2001

(65) Prior Publication Data

US 2002/0174182 A1  Nov. 21, 2002

(51) Int. Cl.
  *G06F 15/16* (2006.01)
(52) U.S. Cl. .......................................... 709/205; 707/1
(58) Field of Classification Search ................ 709/205, 709/202, 220, 223–226, 204, 238; 714/712, 714/739, 1; 706/62; 707/3, 4, 103, 1, 5; 715/764, 733, 759; 713/156; 705/7, 53, 705/2, 26, 38; 716/4, 19; 717/143, 153; 607/59; 719/313; 345/1, 3, 4
See application file for complete search history.

(56) References Cited

U.S. PATENT DOCUMENTS

| | | | | |
|---|---|---|---|---|
| 5,191,611 A | * | 3/1993 | Lang ............................ 705/53 |
| 5,446,874 A | * | 8/1995 | Waclawsky et al. ............ 714/1 |
| 5,519,633 A | * | 5/1996 | Chang et al. .................. 716/19 |
| 5,724,516 A | * | 3/1998 | Temoshenko ................ 709/202 |
| 5,748,907 A | * | 5/1998 | Crane ............................ 705/2 |
| 5,802,514 A | * | 9/1998 | Huber ............................ 707/4 |
| 5,841,980 A | * | 11/1998 | Waters et al. ................ 709/204 |
| 5,974,457 A | * | 10/1999 | Waclawsky et al. ......... 709/224 |
| 5,978,940 A | * | 11/1999 | Newman et al. ............. 714/712 |
| 6,059,842 A | * | 5/2000 | Dumarot et al. ............. 717/153 |
| 6,078,912 A | * | 6/2000 | Buerger et al. ................. 707/1 |

(Continued)

OTHER PUBLICATIONS

PLAN: a Framework and Specification Language with an . . . —Wu, Dube ; home.kst.dit.ie/~bwu/hicss34.pdf.*

(Continued)

Primary Examiner—Thong Vu

(57) ABSTRACT

The invention real time electronic service interaction management system and method facilitates presentation of information that increases the probability of desirable target interaction. Desirable target interaction includes metrics associated with campaign objectives (e.g., maximize profits) and constraints (e.g., budget constraints). The system and method automatically develops interaction motivation plans that determine a stimulation action (e.g., information presented to a target). A motivation interaction plan is a procedure utilized to determine a stimulation action to present to a target with specific attributes under certain system attributes. The present invention adaptively optimizes and tests interaction motivation plans to permit automated learning about target individual interaction activities and accordingly modify interaction motivation plans in both real time and over the lifetime of a campaign. It also facilitates the development of behavioral models that provide predictions associated with the probability of target behavior based upon a set of target characteristics and system attributes.

34 Claims, 7 Drawing Sheets

U.S. PATENT DOCUMENTS

| | | | |
|---|---|---|---|
| 6,144,954 A * | 11/2000 | Li | 706/62 |
| 6,182,258 B1 * | 1/2001 | Hollander | 714/739 |
| 6,308,102 B1 * | 10/2001 | Sieracki et al. | 607/59 |
| 6,321,206 B1 * | 11/2001 | Honarvar | 705/7 |
| 6,324,588 B1 * | 11/2001 | Desruisseaux et al. | 719/313 |
| 6,363,411 B1 * | 3/2002 | Dugan et al. | 709/202 |
| 6,370,573 B1 * | 4/2002 | Bowman-Amuah | 709/223 |
| 6,438,690 B1 * | 8/2002 | Patel et al. | 713/156 |
| 6,496,863 B1 * | 12/2002 | Palmer | 709/224 |
| 6,502,102 B1 * | 12/2002 | Haswell et al. | 707/102 |
| 6,523,151 B1 * | 2/2003 | Hekmatpour | 716/4 |
| 6,523,172 B1 * | 2/2003 | Martinez-Guerra et al. | 717/143 |
| 6,611,872 B1 * | 8/2003 | McCanne | 709/238 |
| 6,625,651 B1 * | 9/2003 | Swartz et al. | 709/226 |
| 6,677,963 B1 * | 1/2004 | Mani et al. | 715/764 |
| 6,684,206 B1 * | 1/2004 | Chen et al. | 707/3 |
| 6,701,345 B1 * | 3/2004 | Carley et al. | 709/205 |
| 6,708,155 B1 * | 3/2004 | Honarvar et al. | 705/7 |
| 6,751,657 B1 * | 6/2004 | Zothner | 709/220 |
| 6,804,709 B1 * | 10/2004 | Manjure et al. | 709/220 |
| 6,892,230 B1 * | 5/2005 | Gu et al. | 709/220 |
| 6,934,748 B1 * | 8/2005 | Louviere et al. | 709/224 |
| 2002/0055975 A1 * | 5/2002 | Petrovykh | 709/205 |
| 2002/0138316 A1 * | 9/2002 | Katz et al. | 705/7 |
| 2002/0194120 A1 * | 12/2002 | Russell et al. | 705/38 |
| 2003/0191832 A1 * | 10/2003 | Satyavolu et al. | 709/223 |
| 2005/0192871 A1 * | 9/2005 | Galuten et al. | 705/26 |

OTHER PUBLICATIONS

An Optimizer for Heterogeneous Systems with . . . —Haas, Kossmann . . . (1996) ; www.db.fmi.uni-passau.de/~kossmann/Papers/debull_garlic.ps.gz.*

Constrained GA optimization—Schoenauer, al. (1993) ; www.eeaax.polytechnique.fr/papers/marc/icga93.ps.gz.*

Optimizing General Design Objectives in Processor-Array Design—Ganapathy, Wah manip.crhc.uiuc.edu/pub/papers/PostScript/C095/C95.ps.gz.*

Generation of Ambient Traffic for Real-time Driving . . . —Bonakdarian, Cremer . . . (1998) www.cs.uiowa.edu/~cremer/papers/image98.ps.gz.*

Background Memory Management for Dynamic Data Structure Intensive . . . —Lin ftp.imec.be/pub/vsdm/reports/memory_optimisation/ATM_mem_mngnt.ps.gz.*

Compositional Verification of Multi-Agent Systems: a . . . —Catholijn Jonker Jan (1998) www.cs.vu.nl/~wai/Papers/IJIS02compver.pdf.*

ADEPT: An Agent-Based Approach to Business Process Management—Jennings, Norman, Faratin (1998) www.ecs.soton.ac.uk/~nrj/download-files/acm-sigmod.ps.*

Mixed Initiative Interfaces for Learning Tasks . . . —Wolfman, Lau . . . (2001) www.cs.washington.edu/homes/wolf/papers/web-iui01.ps.gz.*

* cited by examiner

REAL TIME ELECTRONIC SERVICE INTERACTION MANAGEMENT SYSTEM AND METHOD

FIELD OF THE INVENTION

The present invention relates to the field of real time information management. More particularly, the present invention relates to an electronic system and method (e.g., an electronic commerce management system and method) that facilitates adaptive real time testing and optimization of customer interactions.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized and maximized through the use of distributed network resources that present information to a person and permit the person to interact with the networked system. Most distributed systems expend significant resources to provide information to target individuals in anticipation of eliciting an interaction (e.g., a response) and the manner in which the information is presented to the target individual usually has a significant influence on the likelihood of the individual interacting with the system. Usually, there are a number of intricate factors that impact the likelihood of interaction and developing a presentation that stimulates interaction typically requires rapid analysis of complicated motivating factors.

Traditional electronic technologies typically present information to target individuals in a variety of ways. For example, televisions and computers typically present information in the form of audio (e.g., sounds) and visual (e.g., pictures or graphics images) information. One of the most common and prolific distributed resource systems includes numerous inter-networked computers communicatively coupled together to form the Internet. Electronic systems (e.g., the Internet) usually support a variety of information communication configurations such as information communication from a central resource (e.g., a central location such as a web site hosted on a server computer) to remote resources (e.g., a personal computer at a remote location such as a home or business) and vice versa.

One of the primary objectives of many electronic systems is to motivate a diverse audience to interact with the system. The information is usually presented at a "touch-point" (e.g., a web site on a personal computer, a menu-based voice recognition telephone system, etc.) that permits the target audience to interact with the system (e.g., enter a response). Electronic commerce (e-commerce) Internet sites are one example of a touch-point that presents information to target audiences (e.g., a target individual) with the objective of receiving target interaction (e.g., a purchase). E-commerce Internet sites often involve commercial activities such as selling products or financial services (e.g., on-line banking). The ability of information provided on e-commerce sites to motivate customers or subscribers to interact with a site greatly impacts the benefits of these sites (e.g., consumers purchasing merchandise). Thus, it is often very important for information presented via an electronic system to appeal to the target individual.

Information is often presented to a target individual or audience as part of a campaign. The campaign is typically a series of activities with a related purpose (e.g., motivate interaction) directed towards achieving a particular outcome. The campaign is usually associated with target objectives (e.g., profit, revenue, number of interactions in response to information presentation, etc.) and presentation constraints (e.g., budget limits, target exclusions, minimum or maximum number of information presentations, etc.). One of the primary attributes of a good campaign is presenting information that stimulates interaction consistent with target objectives and presentation constraints. If a target individual cannot understand and relate to the information included in a touch-point, the target individual typically has very little or no interaction with the touch-point.

Determining what manner of presenting information will appeal to and motivate a target individual to interact with a web site usually requires the presentation of information in each touch-point to be painstakingly analyzed (e.g., manually) for impacts on one target individual versus another target individual. Identifying and separating target individual preferences and tendencies and developing a plan for guiding information presentations that correspond to these preferences and tendencies traditionally requires a lot of work over a significant time duration. Managers performing the identification and separation are often required to have diverse capabilities (e.g., an understanding of psychology, business, computer technology) and significant knowledge of how target individuals interact with a variety of systems. The combination of these abilities is relatively rare and persons performing these tasks are relatively expensive. Traditionally, particular presentations are created for one target individual or audience and different presentations are developed for another target individual or audience.

Creating a presentation that is likely to motivate target individual action is typically a long and arduous process and a target individual's tastes or desire may change over time, increasing the difficulty of determining if information is being presented in a desirable manner. The speed at which the performance of target individual preference and tendency analysis is performed is often critical to motivating a target to interact with the touch-point. Target preferences usually change and the ability to quickly detect and adapt to these changes can significantly impact the likelihood of receiving an interaction. Traditional techniques for detecting and adapting to changes in tendencies and preferences of a target individual or audience usually take a relatively long time and are often unable to adjust fast enough to facilitate maximized interactions.

What is required is a system and method that facilitates expedient and efficient presentation of information in a manner that increases the probability of target individual interaction. The system and method should be able to monitor user interactions and test action plans.

DISCLOSURE OF THE INVENTION

The present invention is a system and method that facilitates expedient and efficient presentation of information in a manner that increases the probability of target individual interaction. The present invention system and method is able to monitor user interactions, optimize interaction motivation plans and test interaction motivation plans. In one embodiment of the present invention, a real time electronic service interaction management system and method is utilized to assist development and implementation of electronic commerce (e-commerce) campaign activities. For example, the present invention is utilized to assist electronic marketing optimization (e-MO) by automated management of promotional campaigns in conjunction with an e-commerce site. A present invention real time electronic service interaction management system and method monitors the interactions (e.g., purchasing behavior) of target individuals (e.g., customers) and has the ability to assist development of an interaction motivation plan. An interaction motivation test plan sets guidelines and rules for information presentation to a target audience. The present invention system and method also has the ability to develop interaction motivation test plans for learning about target individual interaction activities and accordingly modify interaction motivation plans (e.g., change decision rules) in both real time and over the lifetime of a campaign.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
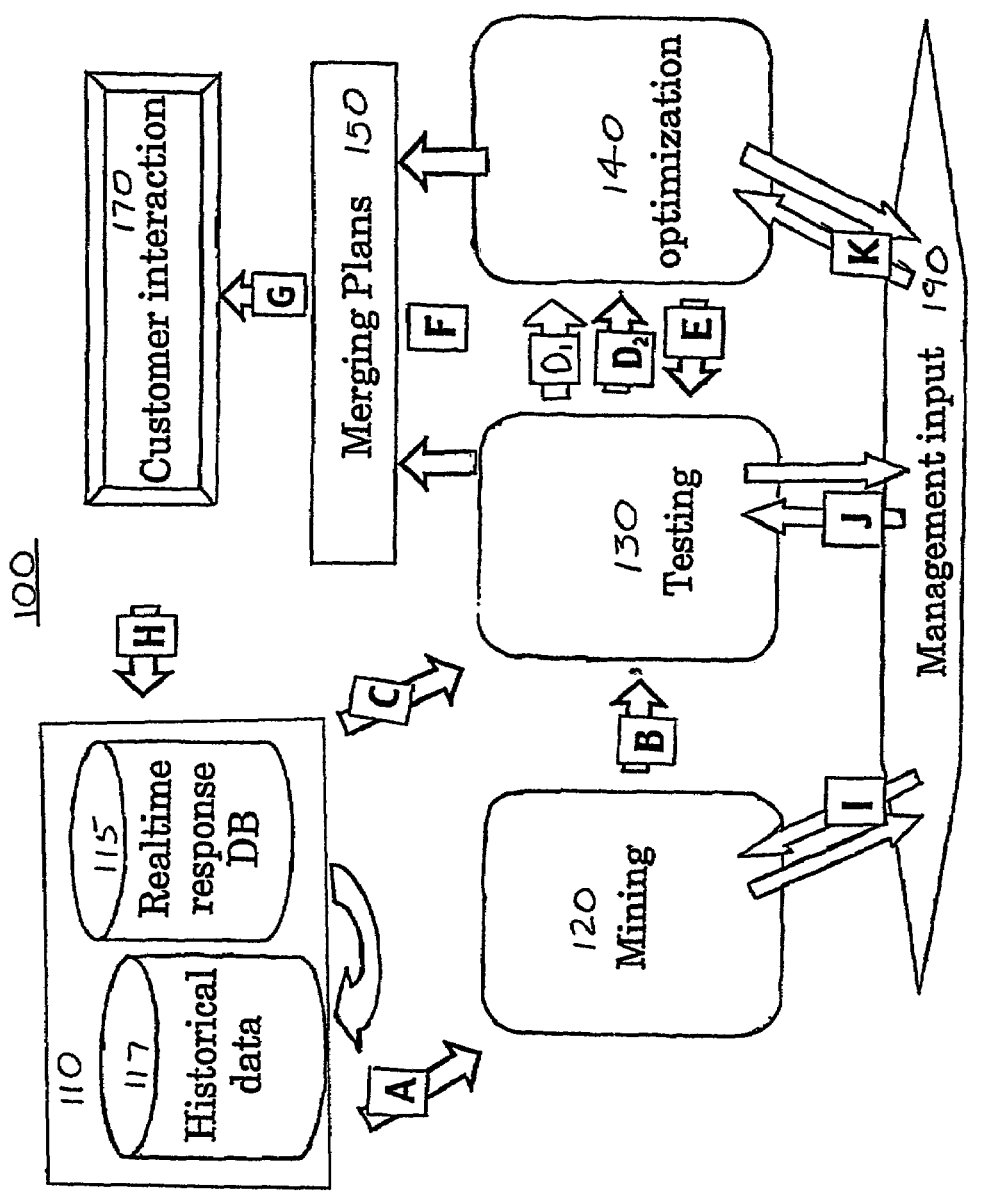
FIG. 1 is a block diagram of one embodiment of a real time electronic service interaction management system of the present invention.

Reference will now be made in detail to the preferred embodiments of the invention, a real time electronic service interaction management system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within an electronic system. These descriptions and representations are the means used by those skilled in the digital arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in the electronic system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise or as apparent from the following discussions, it is appreciated that throughout the present invention, discussions utilizing terms such as "processing" or "computing" or "calculating" or "determining" or "displaying" or the like, refer to the action and processes of an electronic device that manipulates and transforms data represented as physical (electronic) quantities within the system (e.g., within registers, logic gates, memories, etc.) into other data similarly represented as physical quantities within the system devices or other such information storage, transmission or display devices.

The present invention facilitates development of an interaction motivation plan designed to evoke and stimulate target interaction. In one embodiment of the present invention, a real time electronic service interaction management system and method is utilized to aid development of electronic commerce (e-commerce) presentations that are provided to a target (e.g., a customer). For example, the present invention is utilized to assist electronic marketing optimization (e-MO) by automated management of promotional campaigns associated with an e-commerce site. The interaction motivation plan sets guidelines or rules that determine the presentation of information to a target individual (e.g., a customer) as part of an interaction campaign (e.g., an e-commerce marketing campaign). In one embodiment of the present invention, the interaction motivation plan includes guidelines for presenting information in accordance with customer segmentation definitions, promotion definitions, campaign objectives and campaign constraints. A present invention real time electronic service interaction management system and method monitors the interactions (e.g., purchasing behavior) of targets (e.g., customers) and has the ability to continually modify interaction motivation plans (e.g., change information presentation rules and guidelines) in both real time and over the lifetime of an interaction motivation campaign.

Information is presented to a target and the target is permitted to interact with the system. The target is an external object and has an associated set of target attributes or characteristics that include demographic characteristics that describe the target (e.g., age, income, etc.) and behavioral attributes (e.g., number of purchases from a company within a specific time period, click through events to links within a web site, recency and frequency of visits to a store or website, etc.). In one embodiment of the present invention a target has an associated subset of attributes or characteristics that uniquely identify the target (e.g., social security number, identification number, etc.). The present invention is readily adaptable to accommodate interactions from a variety of targets (e.g., a person, an audience, an organization, a business, another system, an electronic device, etc.). In one exemplary implementation of the present invention, a target is a customer accessing information from the system through a touch-point (e.g., an e-commerce site).

In one embodiment of the present invention, information presented to a target is part of a stimulation action. A stimulation action presents information intended to motivate the target to interact with the system. Each stimulation action has an associated set of stimulation attributes or characteristics (e.g., a specific monetary discount amount, a percentage reduction, a formal or informal presentation style, etc.). In one embodiment of the present invention, a stimulation action has an associated subset of attributes or characteristics that uniquely identify the stimulation action. In one exemplary e-commerce implementation of the present invention a stimulation action includes an offer action (e.g., an offer or advertisement to purchase a good or service at a particular price).

The present invention system and methods utilize an interaction motivation plan to determine what stimulation action if any is presented to a target and when to present it. In one exemplary implementation a motivation interaction plan is a procedure utilized to figure out for given system characteristics what stimulation action to present to a target with certain attributes. In one exemplary implementation, an interaction motivation plan is represented by logical rules based on customer and system attributes, by probability distributions of actions to be performed on certain kinds of customers, or by a process of conditional instructions. An exemplary customer and system attribute rule includes if a customer is younger than 30 and the total number of performances of actions is less than 20 then perform a first action. An exemplary based upon probability distributions of actions to be performed on certain kinds of customers includes for all customers younger than 50 present 20% with a first action and 80% with a second action. An exemplary process of conditional instruction rule includes if a customer older than 20 then present a first action and if it triggers a desired interaction then present a second action (e.g., the second action is possibly presented immediately after the first action in real time), if not then present a third action. In one embodiment of the present invention, the interaction motivation plan includes interation (e.g., present offer x until condition y).

In one embodiment of the present invention, an interaction motivation plan includes multiple constituent interaction motivation plans. In one exemplary implementation, the overall interaction motivation plan selects a constituent interaction motivation plan in accordance with rules or guidelines similar to selection of an action above. For example, a constituent interaction motivation plan needs to be activated to further select the action to be presented to a target. This hierarchy of motivation plans permits multiple interaction motivation plans to be considered when it is not clear which one is "best" (e.g., facilitates maximized achievement of campaign objectives within campaign restrictions). The multiple interaction plans are tested and optimized similar to testing and optimization of individual actions.

The present invention system and method tracks and analyzes target response interactions. A response interaction is specific target behavior (e.g., action) in response to a stimulation action. In one embodiment of the present invention, a response interaction has an associated set of response interaction attributes and characteristics (e.g., making a purchase, etc.). In one embodiment of the present invention, a subset of the response interaction attributes and characteristics uniquely identify the response interaction. The response interaction attributes and characteristics are detectable, measurable and recordable. In one exemplary implementation of the present invention, a response interaction includes an emotional reaction of a target (e.g., a target is angry, happy, distraught, etc.).

In one embodiment, the present invention system and method also tracks and analyzes associations between a response interaction and a metric associated with campaign objectives and constraints. For example, if a campaign objective is to increase the recency of an interaction, the present invention system and method tracks a time metric associated with a target interaction. The present invention also analyzes time metric impacts of different interaction motivation plans. In one exemplary implementation, the present invention system and method analyzes the time differences between interactions in response to a first interaction motivation plan and the time differences between interactions in response to a second interaction motivation plan. Another exemplary campaign objective is to increase profitability and the present invention system and method tracks a profit metric associated with a target interaction (e.g., the amount of profit in US dollars realized due to a customer purchase of a product at a particular price). In one exemplary implementation, a present invention system and method develops an interaction motivation plan and tracks profitability metrics associated with responses to the first interaction motivation plan and adaptively changes the interaction motivation plan based upon an analysis of the profitability metrics associated with responses.

In one embodiment of the present invention, baseline information associated with target interaction is received. In one exemplary implementation, a present invention system and method receives and utilizes data on a target interaction with the system when information presented to a target is not part of an stimulation action. In another exemplary implementation, information presented to a target is part of a control action intended to provide baseline information about target interaction. In one embodiment of the present action, a control action includes stimulation actions that are independent of stimulation actions being analyzed by the system and method. For example, a target is presented with information associated with automobiles when the system is analyzing target interaction to a particular advertisement for dog food.

In one embodiment of the present invention, the system has a set of attributes that vary over time. The present invention tracks system attributes and analyzes the impacts of the system attributes on interaction responses. In one exemplary implementation of the present invention, the system attributes include the characteristics of the system on which the present invention is implemented (e.g., the response time of a website). In one embodiment of the present invention the system attributes include other external attributes that may influence or impact target behavior (e.g., weather, current interest rate, budget consumption, time duration, network traffic, road traffic, etc.)

In one embodiment, a present invention system and method develops and utilizes a behavior model that attempts to predict the response interaction of a target when presented with a specific stimulation action. In one exemplary implementation of the present invention, a behavior model maps target attributes, system attributes and a specific stimulation action to response interactions. In one exemplary implementation, the present invention determines an occurrence probability prediction of an interaction response of a target to a specific stimulation action, given a set of attributes (e.g., descriptive and behavioral characteristics) associated with a target and system attributes. In one embodiment of the present invention, a behavior model is utilized to optimize realization of an objective. In one exemplary implementation of the present invention a behavior model changes over time in accordance with recording and analysis of target interactions in response to a stimulation action. In one embodiment of the present invention system and method, a behavior model is generalized to include modeling responses for certain groups or types of stimulation actions with certain attributes.

FIG. 1 is a block diagram of real time electronic service interaction management system 100, one embodiment of the present invention. Real time electronic service interaction management system 100 comprises a database module 110, information mining module 120, testing module 130, optimization module 140, and plan merging module 150. Information is communicated to and from real time electronic service interaction management system 100. In one embodiment of the present invention, real time electronic service interaction management system 100 includes a target (e.g., a customer) interaction module 170 and a management interface module 190. Interaction information is gathered, manipulated, and distributed by the component modules of real time electronic service interaction management system 100.

The component modules of real time electronic service interaction management system 100 cooperatively operate to facilitate development of an interaction motivation plan and creation of information presentation instructions in accordance with the interaction motivation plan. Database module 110 receives and stores information associated with target interaction (e.g., information about customers such as descriptive and behavioral characteristics and their interactions with real time electronic service interaction management system 100), relevant system state and external state information, as well as information associated with the state of a touch-point (a point of interaction with the system). Data mining module 120 analyzes information utilized to predict and describe target interaction behavior (e.g., through techniques such as segmentation, clustering, affinity analysis, etc.). Testing module 130 creates an interaction motivation test plan. In one exemplary implementation, the interaction motivation test plan is directed at automatically learning about target (e.g., customer) interactions based upon a particular touch-point state (e.g. with particular information presentations). The interaction motivation test plan is also directed at testing (e.g., validating and enhancing) the analysis of information by data mining module 120. Optimization module 140 creates optimizing inputs to an interaction motivation plan. In one exemplary implementation of the present invention, the optimizing inputs are directed to increasing user interactions with respect to the specified objectives (e.g., from a system manager) while meeting predetermined constraints (e.g., also specified by the system manager). Plan merging module 150 combines the test inputs and optimization inputs into one interaction motivation plan. Target (e.g., customer) interaction module 170 provides instructions to a "touch point" (e.g., website, call center, email, phone system, a graphical user interface, etc.) for presenting information in accordance with an interaction motivation plan. In one embodiment of the present invention, target interaction module 170 also records customer responses and behavior. Management interface module 190 facilitates communication of information to and from campaign sponsors (e.g., campaign managers).

In one exemplary implementation of the present invention, real time electronic service interaction management system 100 operates on a real time basis. Database 110 is a real time response database and forwards the information in real time. In one embodiment of the present invention, database 110 includes a real time response component 115 that forwards information to testing module 130 for use in testing operations and to historical component 117 for storage with historical data. In one embodiment of the present invention, database 110 forwards information to mining module 120 as needed, including forwarding in real time if required. In one embodiment of the present invention, there is real time interaction between the testing module and the optimization module to refine test inputs and optimization inputs before they are merged into one action plan. For example, testing module 130 interacts with optimization module 140 to focus testing on parameters relevant to an optimal plan for stimulating target (e.g., customer) interaction. For example, the optimization module 140 gives feedback to testing module 130 on which input parameters require further testing.

The present invention is capable of providing various feedback from an optimization module to a testing module. In one exemplary implementation of the present invention, the feedback includes an exclusion list of behavioral model parameters that do not require further testing. Feedback may also includes probabilities expressing the likelihood that certain behavioral model parameters affect the objective to be optimized and or the magnitude of impact of the parameter of the behavioral model on an objective function.

In one embodiment of the present invention, real time electronic service interaction management system 100 facilitates adaptive real time interaction testing. In one exemplary implementation, testing module 130 monitors the interaction responses to a particular test plan in real time. If a certain percentage of real time interactions produce a particular result the testing module does not wait for all responses to be received before determining a conclusion about the test plan. This facilitates rapid and flexible adjustments to an interaction motivation plan. In one exemplary implementation, testing module 130 creates an interaction motivation test plan by altering parameters or values utilized in the interaction motivation test plan logical rules. In one exemplary implementation, testing module 130 automatically changes the customer and system attributes utilized in the rule, automatically changes probability values of actions to be performed on certain kinds of targets, or changes conditions in a process of conditional instructions. For example changing a plan to test the interaction if an action is presented to a customer younger than 20 instead of 30 or changing an interaction motivation plan to present 30% of targets with a first action instead of 20% of the targets.

In one exemplary implementation of the present invention, information is processed through real time electronic service interaction management system 100 and an interaction motivation plan is developed. Referring still to FIG. 1, relevant historical data "A" (e.g., customer profiles, customer transactions, product information, information on previous interactions, information on promotions, etc.) is transferred to mining module 120. The data mining results "B" are fed into testing module 130 (e.g., quantitative data describing customer behavior, candidate interactions, segmentation, etc.). In one exemplary implementation, real time target interaction data "C" (e.g., current customer activity) is also sent to testing module 130. Interaction motivation test plans "D1" and behavior model "D2" are transferred to optimization module 140. Optimization module 140 provides feedback "E" to testing module 130 on which parameters require further testing to increase confidence in an optimized solution (e.g., an optimized interaction motivation plan). Inputs "F" from testing module 130 (e.g., an interaction motivation test plan) and optimization module 140 (e.g., an optimized interaction motivation plan) are transferred to merging module 150 and merged into an interaction motivation plan. The merged interaction motivation plan "G" is transferred to interaction module 170 which creates information presentation instructions in accordance with the merged interaction motivation plan. Information associated with target (e.g., customer) interaction "H" is recorded in a real time response database 115 and archived into historical database 117. In one exemplary implementation of the present invention, system management module 190 operates as an interface that facilitates communication of information "I""J"" and "K" (e.g., campaign objectives and constraints) to and from a manager.

In one embodiment of the present invention, customer interaction module 170 receives target interaction information and provides presentation information and instructions in accordance with an interaction motivation plan. In one embodiment of the present invention, customer interaction module 170 includes a graphical user interface that displays stimulation information in accordance with an interaction motivation plan (e.g., a product or service offer plan). In one embodiment of the present invention, customer interaction module 170 also records which stimulation action (e.g., offer action) was made and customer response actions including the customer identification and system state when the response action occurred. In one exemplary implementation of the present invention, customer interaction module 170 records customer actions and states that, although not relevant to the current interaction motivation plan (e.g., offer plan), are a part of the customer behavior model.

In order to perform these tasks, a target interaction module has three interfaces. One interface is for the system to accept and execute new interaction motivation presentations (e.g., interaction motivation plans). One embodiment of the present invention includes additional methods to facilitate system management, (e.g., to suspend and resume an interaction motivation plan, to report on current load, etc.). The second interface of the target interaction module is for target (e.g., customer) interactions. The interface is deployment-specific and one embodiment includes at least two processes. One process is used to present an offer to a customer in accordance with the interaction motivation plan. The second process is used to record target (e.g., customer) actions and state, either response actions or other target actions and state that are relevant to the behavior model. The third interface is for the Response Database and includes three processes. One process records target (e.g., customer) stimulation actions (e.g., offers). A second process records target (e.g., customer) response actions. A third process records other target behavior (actions and state) that are relevant to the behavior model.

In one embodiment of the present invention, the target interaction module presents information (e.g., an offer or promotional material) to a target according to the procedure defined by the interaction motivation plan. In one exemplary implementation of the present invention, an interaction motivation plan includes a set of instructions that are interpreted and utilized by target interaction module 170 to develop a stimulation action (e.g., an information presentation).

In one embodiment of the present invention, database 110 is a persistent data store that records activity received by the customer interaction module 170 and information from other sources (e.g., other systems or databases) not shown. Database 110 receives two types of data in one exemplary implementation of the present invention. The first type of data is related to an interaction motivation plan. For every offer action, database 110 records the customer identifier, the offer, the time and any other customer or system state that is relevant. The second type of data recorded in the database 110 is any activity or state at the customer interaction module that is relevant to the customer behavior model or that is useful for data mining or analysis. This data is deployment-specific and may include customer behavior data (a customer registered for a service; a customer viewed an article), customer state information (e.g., a new customer is created), customer demographic data (e.g., gender, income), system state (a new product is added), etc.

In one embodiment of the present invention, an interaction motivation plan includes an offer plan. An offer plan is a procedure that determines which particular stimulation actions related to an offer (e.g. an offer action) to present to a target (e.g., the customer) for a given specific target state (e.g., customer description and behavioral attributes) and system state. The offer action is a presentation intended to elicit a response interaction. Each interaction has an associated set of attributes, some of which uniquely identify the action. In one embodiment of the present invention, a target is presented with no offer action or a control offer action. In one exemplary implementation, the control offer action is a placebo that is independent of the offer actions to be examined. Interactions that are received even if no offer action is presented and interactions triggered in response to a control offer action are utilized as a baseline for comparison to other offer actions.

In one embodiment of the present invention, database 110 includes a real time response component 115 and a historical data component 117. Real time response component 115 forwards data relevant to an interaction motivation plan (e.g., offers and responses) and other relevant customer behavior data to the Testing Module 130. Testing module 130 utilizes the information to refine the Customer Behavior Model and to create new Offer Plans. Real time response component 115 also exports data to historical component 117. The data stream forwarded is deployment specific and may include all or part of the Real-time Response Database.

The historical database component 117 of database 110 is a time-varying history of all objects relevant to the system. For example, if the target interaction module is an e-commerce storefront, the historical database may include customer profiles, products and product hierarchies, promotions, advertisements, sales data. In general, each object in the historical database is represented as a time history consisting of an object identifier, a time period and a set of attributes that apply to the object for the time period. In one implementation, the time history may be dropped or maintained only for a subset of objects. All or part of the historical database is accessed by the mining module 120. The historical database may also be accessed by other, auxiliary modules such as a module for generating reports (not shown). The historical database may have other input sources in addition to real-time response database 115.

Figure 2A:
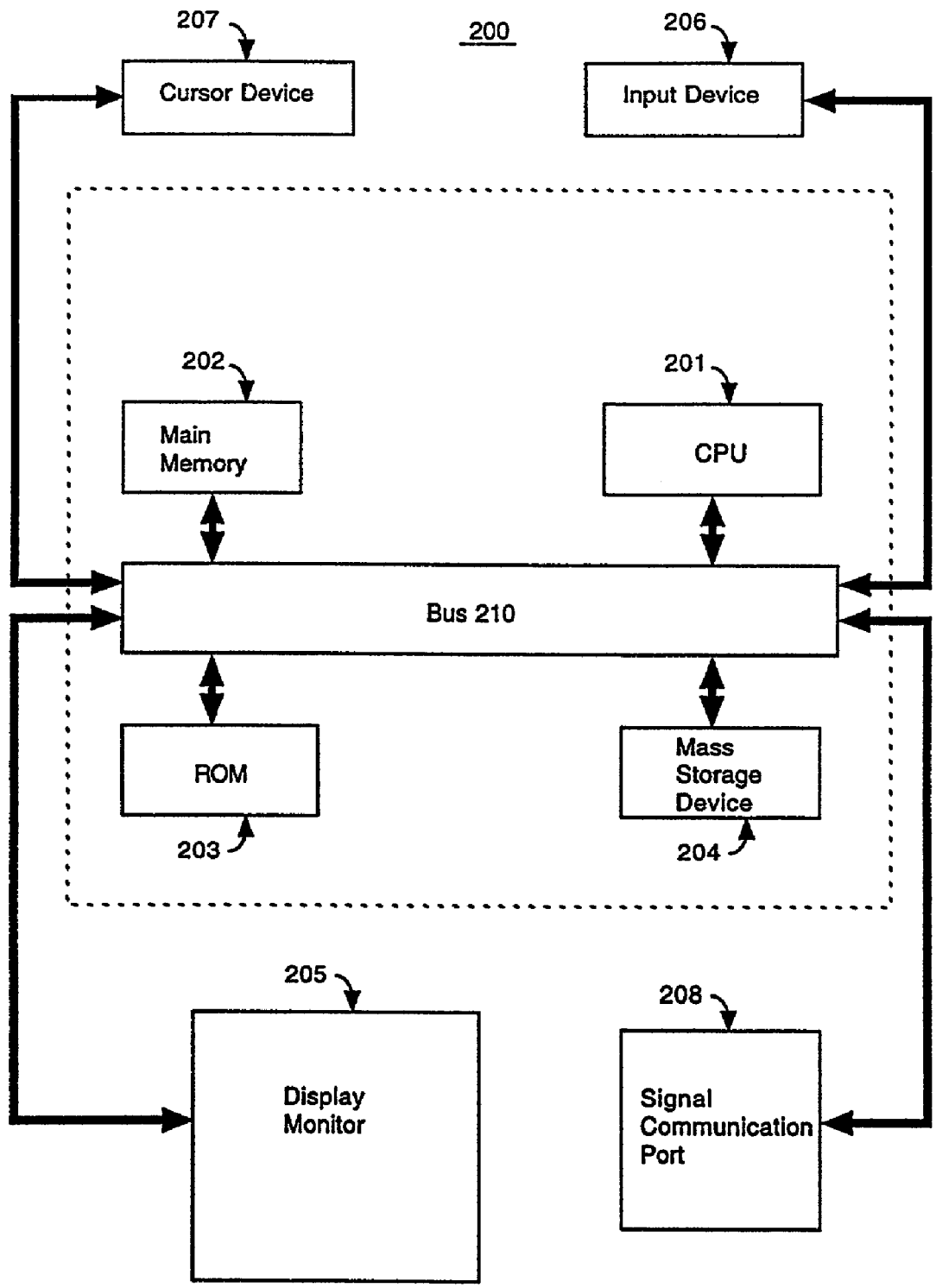
FIG. 2A is a block diagram of one embodiment of a computer system on which the present invention is implemented

FIG. 2A is a block diagram of computer system 200, one embodiment of a computer system on which the present invention is implemented. Computer system 200 includes address/data bus 210, central processor 201, volatile memory 202 (e.g., random access memory RAM), non-volatile memory 203 (e.g., read only memory ROM), optional removable data storage device 204 (e.g., memory stick), display module 205, optional alphanumeric input device 206, optional cursor control or directing device 207, and signal communication port 208. Address/data bus 210 is coupled to central processor 201, volatile memory 202 (e.g., random access memory RAM), non-volatile memory 203 (e.g., read only memory ROM), optional removable data storage device 204 (e.g., memory stick), display module 205, optional alphanumeric input device 206, optional cursor control or directing device 207, and signal communication port 208. In one embodiment of the present invention, real time electronic service interaction management system 100 is implemented on computer system 200.

The components of computer system 200 cooperatively function to provide a variety of functions, including alignment directions. Address/data bus 210 communicates information, central processor 201 processes information and instructions, volatile memory 202 (e.g., random access memory RAM) stores information and instructions for the central processor 201 and non-volatile memory 203 (e.g., read only memory ROM) stores static information and instructions. Optional removable data storage device 204 (e.g., CD) also stores information and instructions. Display module 205 displays information to the computer user. Alphanumeric input device 206 and cursor directing device 207 communicate user input information and command selections to the central processor 201. Signal Communication port 208 is a communication interface (e.g., a serial communications port) for communicating signals to and from coupled peripheral devices.

Figure 2B:
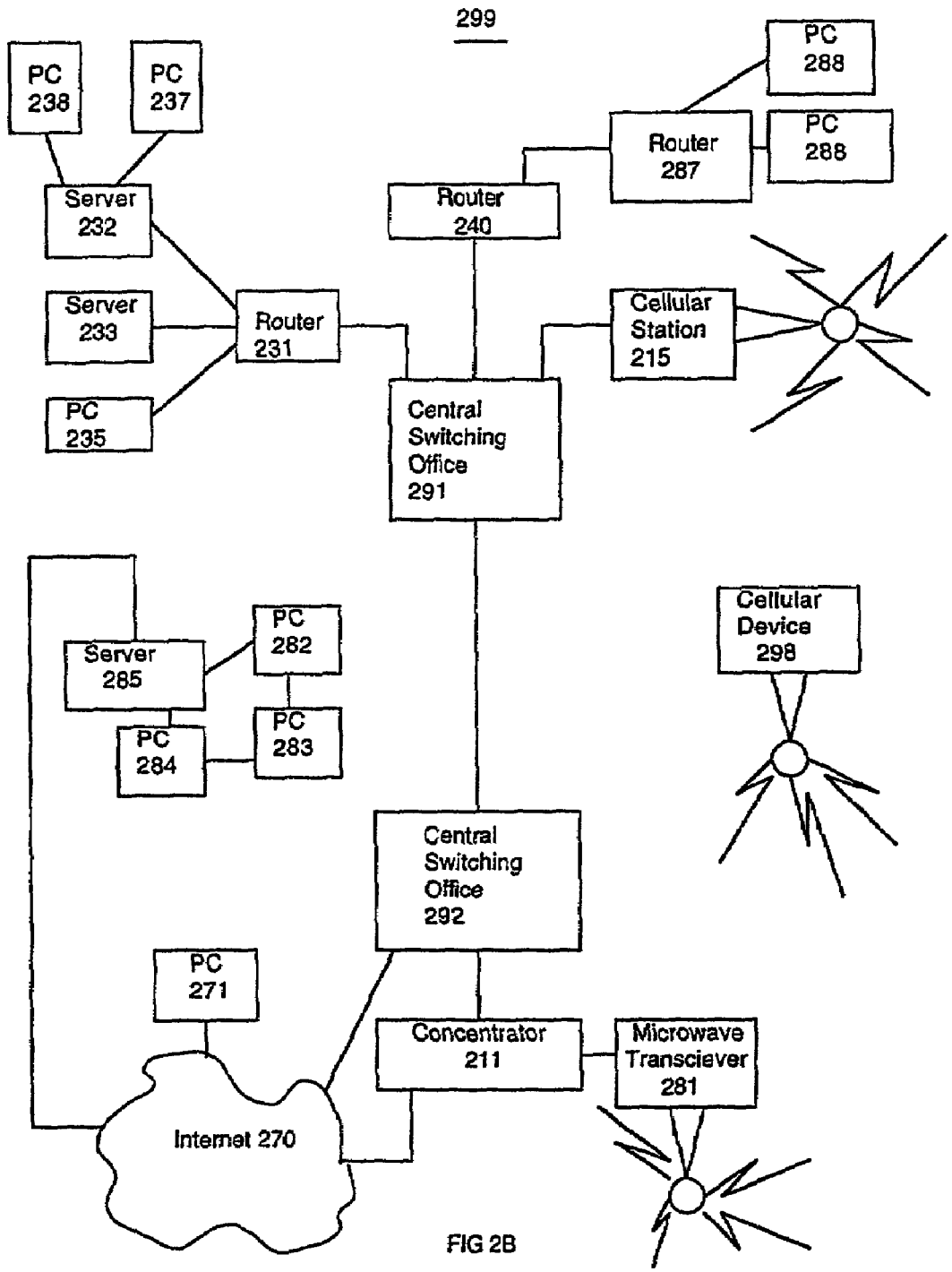
FIG. 2B is a block diagram of one embodiment of a communications network implementation on which a present invention real time electronic service interaction management system is implemented.

FIG. 2B is a block diagram of communications network 299. In one embodiment of the present invention, real time electronic service interaction management system 100 is implemented in communications network 299. Communications network 299 comprises, plain old telephone system (POTS) central switching office 291 and 292, concentrators 211, routers 231, 240 and 287, cellular station 215, cellular device (e.g., phone, handheld computer, etc.) 298, microwave transceiver 281, internet 270, servers 285, 232, and 233, personal computers 235, 237, 238, 282, 283, 284, 288 and 289, and microwave transceiver 281. The components of communications network 299 communicate with each other over a variety of architectures utilizing numerous communication protocols. One exemplary implementation of communications network 299 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Figure 3:
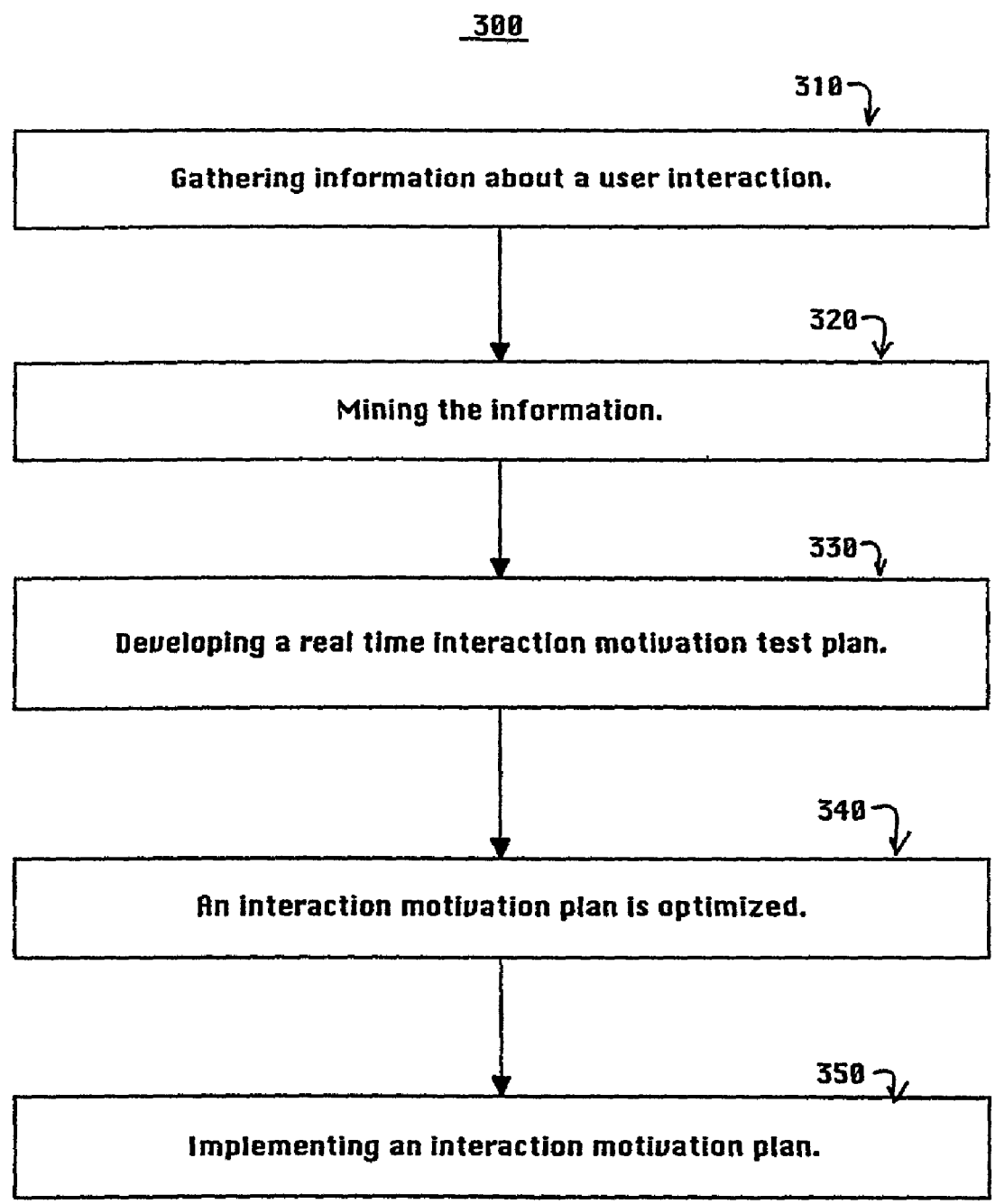
FIG. 3 is a flow chart of one embodiment of a real time electronic service interaction management method.

FIG. 3 is a flow chart of real time electronic service interaction management method 300.

In step 310 information about a target interaction is gathered. In one embodiment of the present invention, gathered information includes preference information, demographic information, related history (e.g., personal history, purchase history, etc.) In one embodiment of the present invention, target interaction information is gathered from an electronic service system (e.g., an e-commerce site on the Internet, an automated telemarketing system, a customer touch point system, etc.). In one exemplary implementation, the interaction information includes customer purchase decisions in response to offer presentations (e.g., an electronic commerce purchase via the Internet).

In step 320 the information is mined. In one embodiment of the present invention, the target interaction information gathered in step 310 is analyzed to discover correlations between interaction characteristics and patterns of behavior that are extracted. In one embodiment of the present invention, the data mining is utilized to discover potentially useful marketing actions (e.g., promotions, cross-sells /up-sells, etc.), model customer behavior (e.g., score customers, estimate promotion acceptance rate and associated revenues/costs, or segment customers) or model the customer interaction channels (e.g., web-site, email, call center, etc.). In one exemplary implementation of the present invention, the output is sent to a system manager. In one embodiment of the present invention, step 320 is optional and data mining is not performed.

In step 330 a real time interaction motivation test plan is developed. In one embodiment of the present invention, a real time interaction motivation test plan is utilized for testing a target audience interaction with stimulation actions associated with a particular interaction motivation plan. In one exemplary implementation, the real time interaction motivation test plan is designed to test a target audience interaction with a particular marketing or sales presentation via a particular customer interaction channel. In one embodiment of the present invention, a real time interaction motivation test plan development process is implemented.

In step 340 an interaction motivation plan is optimized. In one embodiment of the of the present invention, optimizing an interaction motivation plan includes presenting the target audience with information consistent with campaign objectives (e.g., to optimize revenue or to purchase a particular product). In one exemplary implementation in which increased target interaction is one of the campaign objectives, optimizing an interaction motivation plan includes developing a presentation of information likely to motivate a target audience to interact with the system. In one embodiment of the present invention, an interaction motivation plan optimization process is implemented.

In step 350 an interaction motivation plan is implemented. In one embodiment of the present invention, implementing an interaction motivation plan includes presenting motivation information to a target audience.

In one embodiment of the present invention, each step of real time electronic service interaction management method 300 is triggered based upon a particular condition. In one exemplary implementation each step of real time electronic service interaction management method is triggered whenever a manager decides. In one exemplary implementation of the present invention, a step is triggered based upon specific states (e.g., budget consumptions or traffic conditions, etc.) and/or based upon customer interactions. In yet another exemplary implementation of the present invention, a step is triggered periodically at regular intervals or at specific times.

Figure 4:
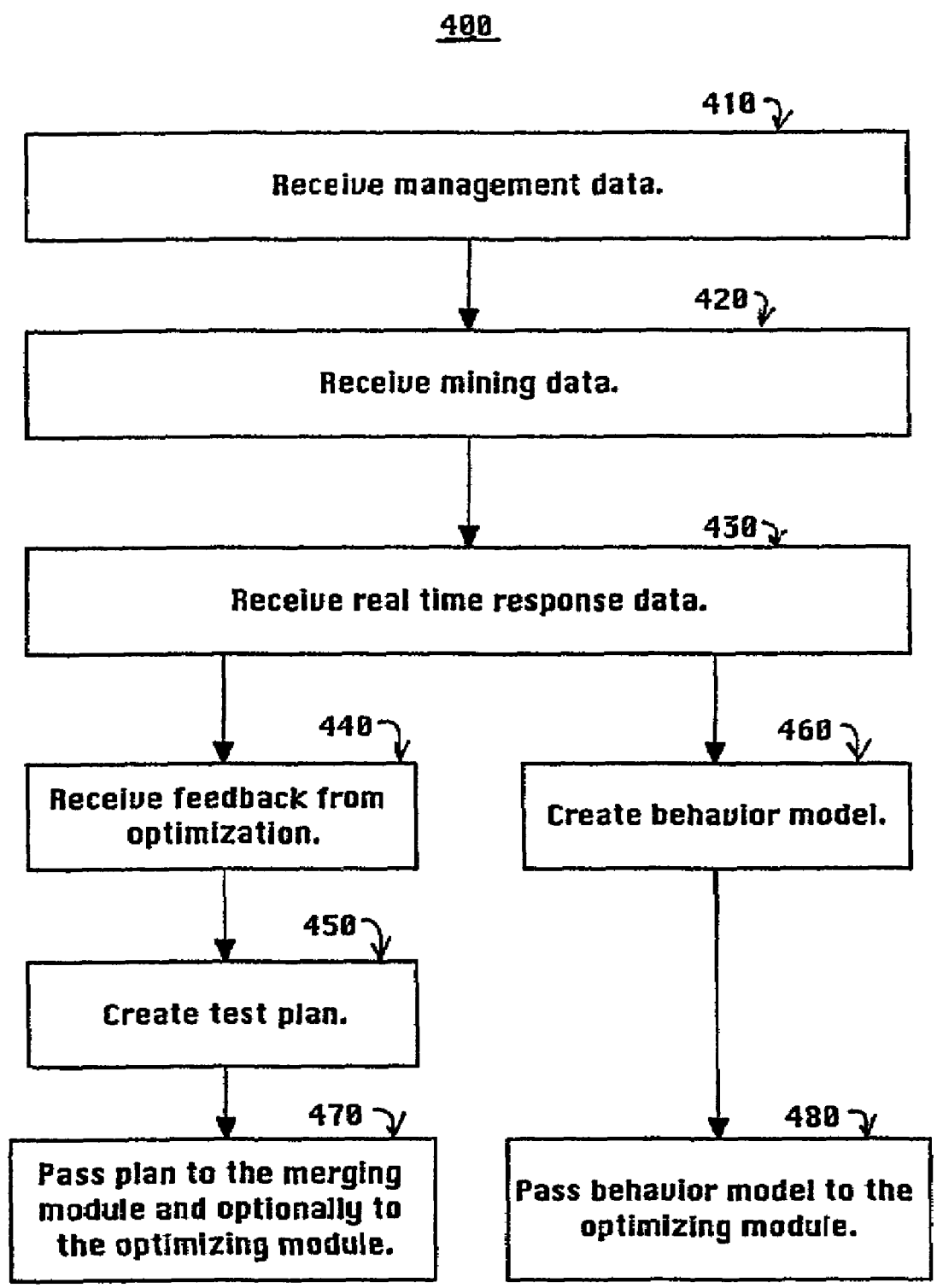
FIG. 4 is a flow chart of one embodiment of a real time interaction motivation test plan development process utilized in a present invention real time electronic service interaction management method.

FIG. 4 is a flow chart of real time interaction motivation test plan development process 400, one embodiment of a real time interaction motivation test plan development process utilized in step 330.

In step 410 management data relevant to the testing is received from a user interface (human interaction) and/or another automated system. In one embodiment of the present invention, the management data includes testing objectives (e.g. required margin of error and confidence levels), testing constraints (e.g. testing budget), system status (e.g., time, customer remaining in database) and, if available, estimates for the data to be tested.

In step 420 data mining results are received. In one exemplary implementation of the present invention, results of data mining relevant for testing include potential action plans based on past interaction history (e.g., passively developed action plans), preliminary behavior models, or data relevant to creating behavior models (e.g. customer segmentations).

In step 430 real time target interaction data (e.g., data resulting from recent target interactions) is received. In one embodiment of the present invention, real time target interaction data includes raw form data (interaction records) and aggregated data (e.g., sums, averages, empirical variances, etc.). In one embodiment of the present invention, historical data is received from another system and utilized in real time interaction motivation test plan development process 400.

In step 440 feedback from optimization operations is received. In one embodiment of the present invention, feedback from optimization operations includes relevance of parameters to be estimated in testing for potential optimal solutions. If a parameter is unlikely to influence the optimal plan, its testing can be scaled down to save scarce resources and to speed up testing. In some cases, there may be no feedback from optimization operations but this does not prevent the creation of the interactive motivation test plan.

In step 450 an interaction motivation test plan that meets management constraints and objectives is created. In one embodiment of the present invention, a test plan defines (e.g., a rule that determines) which action to perform on a target (e.g., a customer) if the system is in a given state.

In step 460 a behavior model is created. In one embodiment of the present invention, a behavior model is a predictive function that returns estimated metrics for the response of a target with given attributes if a given action is performed on the target in a given system state. The response captures any target behavior relevant to the action over a given period of time after the action. The response could be a number of things related to the customer. The response could be how often the customer comes back to the store and the objective is to increase the frequency of them coming back. It can be expressed in functional form, in the form of logical rules, decision trees, etc. Depending on the form in which it is expressed, there are number of standard techniques for the derivation of behavior models including linear regression, logistic regression, CART, etc. In one exemplary implementation of the present invention, a behavior model that is created takes into account the type of interface utilized.

In step 470 the interaction motivation test plan and behavior model are passed to other operations. In one exemplary implementation, the test plan is forwarded to merging operations. In one embodiment of the present invention, a behavior model is passed to optimization operations.

In step 480 the behavior model is passed to optimization operations.

Figure 5:
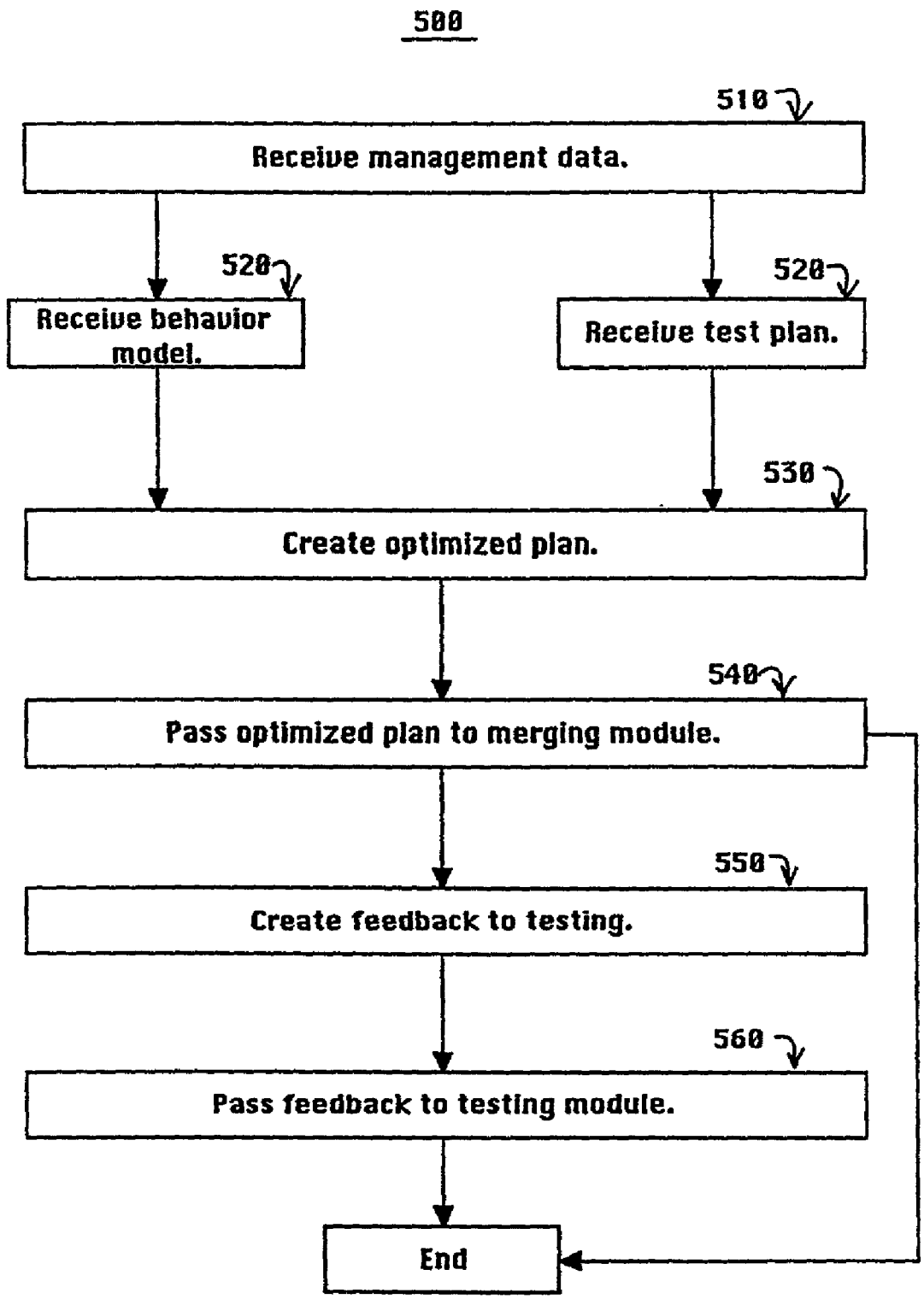
FIG. 5 is a flow chart of one embodiment of an interaction motivation plan optimization process included in a present invention real time electronic service interaction management method.

FIG. 5 is a flow chart of interaction motivation plan optimization process 500, one embodiment of an interaction motivation plan optimization process implemented in step 340.

In step 510 management data relevant to optimization is received from a user interface (human interface) and/or another automated system. In one embodiment of the present invention, the management data includes optimization objectives (e.g. maximize revenue, profit, number of conversions, etc.), optimization constraints (e.g. campaign budget, inventory availability, etc.), prior knowledge and system status information(e.g. time, customer not having visited during the current campaign).

In step 520 behavior model data is received from testing operations. A behavior model is a predictive function that returns estimated metrics for the response of a user (e.g., a customer) with given attributes if a given action is performed on the user in a given system state. The behavior model can be expressed in functional form, in the form of logical rules, decision trees, etc. Depending on the form in which it is expressed, there are number of standard techniques for the derivation of behavior models including linear regression, logistic regression, CART, etc.

In step 525 the test plan is received.

In step 530 an optimized plan is created. It is appreciated that the present invention is readily adapted to included a variety of optimization techniques including Linear Programming, Integer Programming, Mixed Integer Programming, Dynamic Programming, Non-linear Programming, Constraint Programming, or Meta-Heurustics (Genetic Algorithms, Simulated Annealing, Tabu Search, Steepest Descent Methods). In one exemplary implementation of the present invention, the choice of the optimization method depends on the formulation of the model of target (e.g., customer) interactions.

In step 540 the optimized plan is passed to presentation operations. In another embodiment of the present invention, the optimized plan is passed to plan merging module 150. In one embodiment of the present invention, the optimized plan is merged when it is passed to the presentation operations.

In step 550 feedback to testing operations is created. One embodiment of the present invention utilizes Sensitivity Analysis and the impact of changes of input parameters to the optimization on the objective function can be estimated. Based on that impact, an estimate of the probability that a given parameter will have significant impact on the optimal solution can be computed. Testing of parameters with a small probability can be reduced without affecting the validity of the optimal solution. Significant reduction in testing cost and time can result from this feedback. An interactive motivation test plan that meets management constraints and objectives is created. An interaction motivation plan is a rule that determines which action to perform on a customer if the system is in a given state In step 560 the feedback is passed to testing operations (e.g., a testing module).

Figure 6:
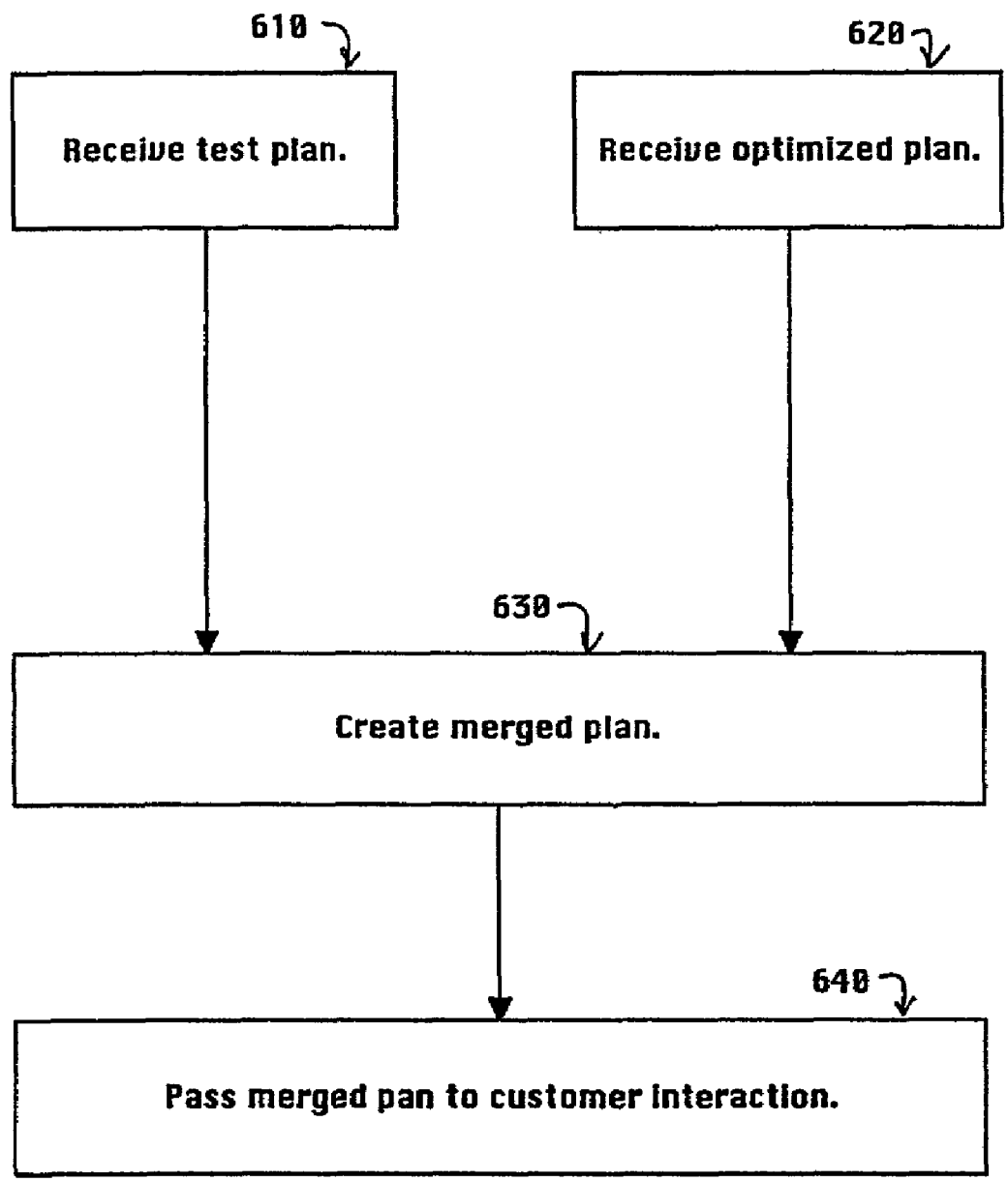
FIG. 6 is a flow chart of one embodiment of a present invention merging process included in a present invention real time electronic service interaction management method.

In one embodiment of the present invention, real time electronic service interaction management method 300 includes an interaction motivation test plan and an optimized interaction motivation plan merging step. FIG. 6 is a flow chart of merging process 600, one embodiment of a present invention merging process.

In step 610 an interaction motivation test plan is received from testing operations (e.g., test process 400 or testing module 130).

In step 620 an optimized interaction motivation plan is received from optimization operations (e.g., optimization process 500 or optimization module 140).

In step 630 a new interaction motivation plan is created that can have features of both an optimized interaction motivation plan and an interaction motivation test plan. A particular method is to create a plan that applies the test plan to a certain percentage of the population and the optimized plan to the rest of the population using statistical sampling. If the testing of actions is based on a segmentation, a more efficient merged plan would be the one the administers the maximum of the two numbers of tests for a given segment-action pair prescribed by both plans. Other merging schemes include weighted or conventional averages. Ignoring one of the plans (e.g., either an interaction motivation test plan or an optimized interaction motivation test plan) and implementing the other is also a valid merging algorithm.

In step 640 the merged interaction motivation plan is passed to the customer interaction module where it is executed.

In one exemplary implementation of the present invention, the merging of plans is not necessary if the test plan is passed to the optimization module and integrated into the optimization as a set of constraints. In effect, the optimization module does the merging in this case and the Merging Module simply makes the optimized plan the new offer plan.

Thus the present invention facilitates expedient and efficient presentation of information in a manner that increases the probability of target individual interaction consistent with campaign objectives and within campaign constraints. The system and method is able to monitor user interactions and test action plans. The invention permits real time adaptive testing that conserves resources and time. The present invention also enables optimization feedback to be included in the real time adaptive testing operations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented real time electronic service interaction management system comprising:
   a target interaction module for providing instructions to a touch point that presents information in accordance with an interaction motivation plan and receives a target interaction, wherein the interaction motivation plan provides rules for presenting offers to customers to purchase products or services using e-commerce;
   a database module for storing information associated with the target interaction in response to the interaction motivation plan; and
   a testing module for providing inputs to the interaction motivation plan.

2. The computer implemented real time electronic service interaction management system of claim 1 wherein the database module includes a real time response database component that forwards the information associated with the target interaction in real time to the testing module and the testing model engages in adaptive testing procedures.

3. A computer implemented real time electronic service interaction management system of claim 1 further comprising an optimization module for optimizing inputs to the interaction motivation plan.

4. The computer implemented real time electronic service interaction management system of claim 3 wherein the optimizing inputs are directed to increasing target interaction metrics with respect to specified objectives while meeting certain constraints.

5. The computer implemented real time electronic service interaction management system of claim 3 further comprising an interaction motivation plan merging module for combining the test inputs and the optimization inputs into one interaction motivation plan.

6. The computer implemented real time electronic service interaction management system of claim 1 wherein there is real time interaction between the testing module and the optimization module to refine test inputs and optimization inputs before they are merged into one interaction motivation plan.

7. The computer implemented real time electronic service interaction management system of claim 6 wherein the real time interaction between the testing module and the optimization module includes the communication of feedback information.

8. A computer implemented real time electronic service interaction management system of claim 1 further comprising an information mining module for rearranging and analyzing the information associated with a target interaction.

9. A computer implemented real time electronic service interaction management system of claim 8 wherein the rearranging and analysis of the information associated with the target interaction is utilized to produce a behavioral model.

10. The computer implemented real time electronic service interaction management system of claim 9 wherein the test inputs are directed at testing the behavioral model and the analysis of the information associated with the target interaction information.

11. The computer implemented real time electronic service interaction management system of claim 1 further comprising a management interaction module for communicating interaction motivation plan objectives and constraints.

12. The computer implemented real time electronic service interaction management system of claim 1 wherein the target interaction includes information about the customers.

13. The computer implemented real time electronic service interaction management system of claim 12 wherein the information about the customers includes historical purchase characteristics of the customers.

14. The computer implemented real time electronic service interaction management system of claim 1 wherein the touch point is an e-commerce site where the customers view the offers to purchase the products or services.

15. A computer implemented real time electronic service interaction management system comprising:
   a target interaction module for providing instructions to an e-commerce site that presents information in accordance with an interaction motivation plan and receives target interactions, wherein the interaction motivation plan provides rules for presenting offers to customers to purchase products or services using e-commerce;
   a database module for storing information associated with a target interaction in response to the interaction motivation plan;
   an information mining module for rearranging and analyzing the information associated with the target interaction;
   a testing module for providing inputs to the motivation test plan; an optimization module for optimizing inputs to the interaction motivation plan; and
   an interaction motivation plan merging module for combining the test inputs and the optimization inputs into the interaction motivation plan.

16. The computer implemented real time electronic service interaction management system of claim 15 wherein the target interaction includes information about the customers.

17. The computer implemented real time electronic service interaction management system of claim 16 wherein the information about the customers includes historical purchase characteristics of the customers.

18. The computer implemented real time electronic service interaction management system of claim 15 wherein the e-commerce site is where the customers view the offers to purchase the products or services.

19. A real time electronic service interaction management method comprising the steps of:
    gathering target interaction information including at least one of demographic information of customers and purchase history of customers;
    developing an interaction motivation test plan to present target customers with a marketing or sales presentation; and
    implementing the interaction motivation plan.

20. A real time electronic service interaction management method of claim 19 further comprising the step of optimizing the interaction motivation plan in real time while the interaction motivation plan is being presented to the target customers.

21. A real time electronic service interaction management method of claim 19 further comprising the step of mining the target interaction information.

22. The real time electronic service interaction management method of claim 19 further comprising analyzing the target interaction information to discover patterns of behavior of the target customers.

23. The real time electronic service interaction management method of claim 19 further comprising the step of automatically developing a real time interaction motivation plan that is utilized for testing a target interaction with the particular interaction motivation plan.

24. The real time electronic service interaction management method of claim 19 further comprising the step of merging an interaction motivation test plan and an optimization plan.

25. A real time electronic service interaction management method of claim 19 wherein the target interaction information is gathered from at least one e-commerce site on the internet.

26. A real time electronic service interaction management method of claim 19 wherein the purchase history of customers includes customer purchase decisions in electronic commerce via the internet in response to advertisements.

27. A real time electronic service interaction management method comprising:
    gathering target interaction information;
    developing an interaction motivation test plan; and
    implementing the interaction motivation test plan;
    wherein developing an interaction motivation test plan includes: receiving management data relevant to the interaction motivation test plan, wherein the management data includes testing objectives, testing constraints, and estimates for the data to be tested;
    receiving data mining results including potential interaction motivation plans based on past interaction history, preliminary behavior models, or data relevant to creating behavior models;
    receiving real time target interaction data including raw form data and aggregated data;
    receiving feedback from optimization operations including relevance of parameters to be estimated in testing for potential optimal solutions;
    creating a test plan that meets management constraints and objectives;
    creating a behavior model that returns estimated metrics for the response of a target with given attributes if a given action is performed on the target in a given system state; and
    passing the interaction motivation test plan to other operations.

28. A real time electronic service interaction management method comprising:
    gathering target interaction information;
    developing an interaction motivation test plan and an interaction motivation optimization process; and
    implementing the interaction motivation test plan;
    wherein the interaction motivation optimization process includes: receiving management data relevant for optimization including optimization objectives, optimization constraints, prior knowledge and system status information;
    receiving behavior model data from testing operations that return estimated metrics for the response of a target with given attributes if a given action is performed on the target in a given system state;
    creating an optimized interaction motivation plan;
    passing the optimized interaction motivation plan to presentation operations; and
    creating feedback to testing operations utilizing sensitivity analysis in which the impact of changes to input parameters on the objective function are estimated.

29. A real time electronic service interaction management method, comprising:
    providing rules that determine a presentation of offers for products or services to customers using e-commerce;
    presenting, per the rules, the customers with the presentation of offers for the products and services;
    monitoring purchasing behaviors of the customers presented with the presentation; and
    modifying the rules and the presentation in response to the purchasing behavior of the customers, wherein modifying the rules is in real time while the presentation of at least some offers for products or services is still being presented to customers.

30. A real time electronic service interaction management method of claim 29 further comprising presenting, via e-commerce, customers with the modified presentation.

31. A real time electronic service interaction management method of claim 29 wherein modifying the rules alters a purchasing behavior of customers.

32. A real time electronic service interaction management method of claim 29 further comprising determining a probability of purchases, by the customers, of the products and services based on the purchasing behavior of at least some customers.

33. A real time electronic service interaction management method of claim 29 further comprising determining a probability of an emotional reaction, by the customers, when presented with the presentation of offers for the products and services.

34. A real time electronic service interaction management method of claim 29 wherein the presentation is an advertisement including one of a monetary discount or a percentage reduction for the products or services.

* * * * *